(12) United States Patent
Seo et al.

(10) Patent No.: US 9,430,639 B2
(45) Date of Patent: Aug. 30, 2016

(54) DATA DE-DUPLICATION IN A NON-VOLATILE STORAGE DEVICE RESPONSIVE TO COMMANDS BASED ON KEYS TRANSMITTED TO A HOST

(71) Applicant: SAMSUNG ELECTRONICS CO., LTD., Suwon-si, Gyeonggi-do (KR)

(72) Inventors: Man Keun Seo, Hwaseong-si (KR); Kwang Hoon Kim, Seoul (KR); Chan Ik Park, Suwon-si (KR); Sang Kyoo Jeong, Seoul (KR); Hong Rak Son, Anyang-si (KR)

(73) Assignee: Samsung Electronics Co.,. Ltd., Suwon-si, Gyeonggi-do (KR)

( * ) Notice: Subject to any disclaimer, the term of this patent is extended or adjusted under 35 U.S.C. 154(b) by 32 days.

(21) Appl. No.: 14/505,909

(22) Filed: Oct. 3, 2014

(65) Prior Publication Data

US 2015/0178224 A1    Jun. 25, 2015

(30) Foreign Application Priority Data

Dec. 24, 2013    (KR) .................... 10-2013-0162460

(51) Int. Cl.
*G06F 3/06* (2006.01)
*G06F 12/08* (2016.01)
*G06F 21/44* (2013.01)
*G06F 21/64* (2013.01)

(52) U.S. Cl.
CPC .............. *G06F 21/44* (2013.01); *G06F 3/061* (2013.01); *G06F 3/067* (2013.01); *G06F 3/0641* (2013.01); *G06F 12/0871* (2013.01); *G06F 21/64* (2013.01); *G06F 2212/1052* (2013.01); *G06F 2212/1056* (2013.01)

(58) Field of Classification Search
CPC ..................... G06F 2003/0691; G06F 3/0608; G06F 3/0641; G06F 12/0246; G06F 12/0871
See application file for complete search history.

(56) References Cited

U.S. PATENT DOCUMENTS

| 7,818,495 | B2 | 10/2010 | Tanaka et al. |
| 8,205,065 | B2 | 6/2012 | Matze |
| 8,346,736 | B2 | 1/2013 | Haustein et al. |
| 8,352,676 | B2 | 1/2013 | Kawamura et al. |
| 8,463,981 | B2 | 6/2013 | Mori et al. |
| 8,671,082 | B1* | 3/2014 | Yadav ............... G06F 17/30156 707/692 |
| 2009/0019246 | A1* | 1/2009 | Murase ................. G06F 1/3203 711/162 |
| 2011/0055471 | A1 | 3/2011 | Thatcher et al. |
| 2012/0137054 | A1 | 5/2012 | Sadri et al. |
| 2012/0260021 | A1 | 10/2012 | Rudelic |
| 2012/0260060 | A1 | 10/2012 | Hwang et al. |
| 2013/0097380 | A1* | 4/2013 | Colgrove .......... G06F 17/30159 711/118 |
| 2013/0151759 | A1 | 6/2013 | Shim et al. |
| 2013/0311434 | A1* | 11/2013 | Jones ................. G06F 17/30156 707/692 |
| 2014/0281155 | A1* | 9/2014 | Cohen ................... G06F 3/0619 711/103 |

* cited by examiner

*Primary Examiner* — Hal Schnee
(74) *Attorney, Agent, or Firm* — Volentine & Whitt, PLLC (57) ABSTRACT

A data storage device is configured to perform data de-duplication. A method of operating the data storage device includes receiving a first command and write data output from a host and storing the write data in a volatile memory in response to the first command, and writing the write data stored in the volatile memory in a non-volatile memory in response to a second command output from the host.

20 Claims, 7 Drawing Sheets

DATA DE-DUPLICATION IN A NON-VOLATILE STORAGE DEVICE RESPONSIVE TO COMMANDS BASED ON KEYS TRANSMITTED TO A HOST

CROSS-REFERENCE TO RELATED APPLICATIONS

A claim of priority under 35 U.S.C. §119(a) is made to Korean Patent Application No. 10-2013-0162460 filed on Dec. 24, 2013, the disclosure of which is hereby incorporated by reference in its entirety.

BACKGROUND

Embodiments of the present inventive concept relate to data de-duplication technologies, and more particularly, to methods for operating a data storage device which is configured to perform a data de-duplication function, and to methods for operating a system including such a data storage device.

Data de-duplication is used in a variety of manners to improve a data transfer speed of a data storage device and to increase utilization of storage space of the data storage device.

Generally, for example, a fingerprint-based data de-duplication technology is used in a server system. The fingerprint-based data de-duplication technology is a technology that generates a short bit string representing a large data in a method of compressing data, searches for duplicated data duplicated with the data based on the generated fingerprint, and when the same data as the duplicated data are already present in a data storage device according to the search result, avoids storage and transfer of the duplicated data.

The fingerprint may be generated by using a hash key. However, when the fingerprint is generated, a device which generates the fingerprint may require a considerably large amount of operations, and may further require a considerably large storage space to store and manage the fingerprint.

SUMMARY

An embodiment of the present inventive concepts is directed to a method of operating a data storage device which is configured to perform data de-duplication. The method includes receiving a first command and write data output from a host and storing the write data in a volatile memory in response to the first command, and writing the write data stored in the volatile memory in a non-volatile memory in response to a second command output from the host.

The operation method further includes generating an authentication key using the write data based on the first command, transmitting the authentication key to the host, erasing the write data stored in the volatile memory or writing the write data stored in the volatile memory in the non-volatile memory in response to the second command including an indication signal which is output from the host and indicates whether or not the write data are duplicated.

The generating of an authentication key may be generated by a selected one of a plurality of authentication key generation engines each using a different authentication algorithm.

Each of the plurality of authentication key generation engines may be embodied in hardware.

The selected one may be selected based on the first command.

According to an exemplary embodiment, the generating of an authentication key may include non-linear randomizing the write data using the selected one and generating the authentication key by performing a cyclic redundancy check (CRC) encoding on the non-linear randomized data.

According to another exemplary embodiment, the generating of an authentication key may include non-linear randomizing the write data using the selected one and generating the authentication key by performing a Bose-Chaudhuri-Hocquenghem (BCH) encoding on the non-linear randomized data.

When the volatile memory is a DRAM, the non-volatile memory is a NAND flash memory including a SLC region and a MLC region, and the data storage device is a solid state drive, a method of operating the data storage device further includes receiving a third command output from the host and an authentication key table including the authentication key, and writing the authentication key table in the SLC region based on the third command.

Another exemplary embodiment of the present inventive concepts is directed to a method of operating a system including a data storage device which is configured to perform data de-duplication and a host which controls an operation of the data storage device. The method includes receiving, by the data storage device, a first command and write data output from the host and storing the write data in a volatile memory in response to the first command, and writing, by the data storage device, the write data stored in the volatile memory in a non-volatile memory in response to a second command output from the host.

The method of operating a system further includes generating, by the data storage device, an authentication key using the write data based on the first command, transmitting, by the data storage device, the authentication key to the host, comparing an authentication key received by the host with each of authentication keys included in an authentication key table, generating the second command including an indication signal which indicates whether or not the write data are duplicated according to a result of the comparison, and transmitting the generated second command to the data storage device, and erasing, by the data storage device, the write data stored in the volatile memory or writing the write data stored in the volatile memory in the non-volatile memory in response to the indication signal.

Each of the plurality of authentication key generation engines is embodied in firmware, and the selected one parses the first command and is selected by a CPU based on a result of the parsing.

Yet another embodiment of the present inventive concepts is directed to a data storage device, including a volatile memory, a non-volatile memory, and a control circuit which receives a first command and write data output from a host, writes the write data in the volatile memory in response to the first command, and writes the write data stored in the volatile memory in the non-volatile memory in response to a second command output from the host.

The control circuit includes a CPU which generates a selection signal in response to selection information included in the first command, a plurality of authentication key generation engines, a selector which selectively enables one of the plurality of authentication key generation engines in response to the selection signal, a first memory controller which stores the write data in the volatile memory according to a control of the CPU, and a second memory controller which transmits the write data output from the volatile memory to the non-volatile memory according to a control of the CPU. The authentication key generation engine enabled by the selector generates an authentication key using the write data stored in the volatile memory, and the authentication key is transmitted to the host by the control circuit.

When the CPU receives the second command which includes an indication signal indicating that the write data are duplicated from the host, the CPU controls the first memory controller so as to delete the write data stored in the volatile memory.

When the CPU receives the second command which includes an indication signal indicating that the write data are not duplicated from the host, the CPU controls at least one of the first memory controller and the second memory controller so as to write the write data stored in the volatile memory in the non-volatile memory.

BRIEF DESCRIPTION OF THE DRAWINGS

These and/or other aspects and advantages of the present inventive concepts will become apparent and more readily appreciated from the detailed description that follows, taken in conjunction with the accompanying drawings, in which.

DETAILED DESCRIPTION OF THE EMBODIMENTS

The present inventive concepts now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The data storage device according to an exemplary embodiment of the present inventive concepts may generate either a fingerprint or an authentication key using one of a plurality of authentication modules embodied therein.

The data storage device according to an exemplary embodiment of the present inventive concepts may (1) generate an authentication key using a newly-defined first command, (2) delete write data stored in a volatile memory or write the write data in a non-volatile memory in response to a newly-defined second command which represents (or indicates) whether or not data are duplicated, (3) store an authentication key table in a SLC storage region of the non-volatile memory using a newly-defined third command, and (4) reduce an amount of operation and operation time consumed in generating an authentication key using an authentication key generation module which has a new structure.

The first command, the second command, or the third command may be parsed by a CPU or a decoder of the data storage device, and the CPU or an interface controller may control one or more corresponding elements (or components) according to a result of the parsing.

Figure 1:
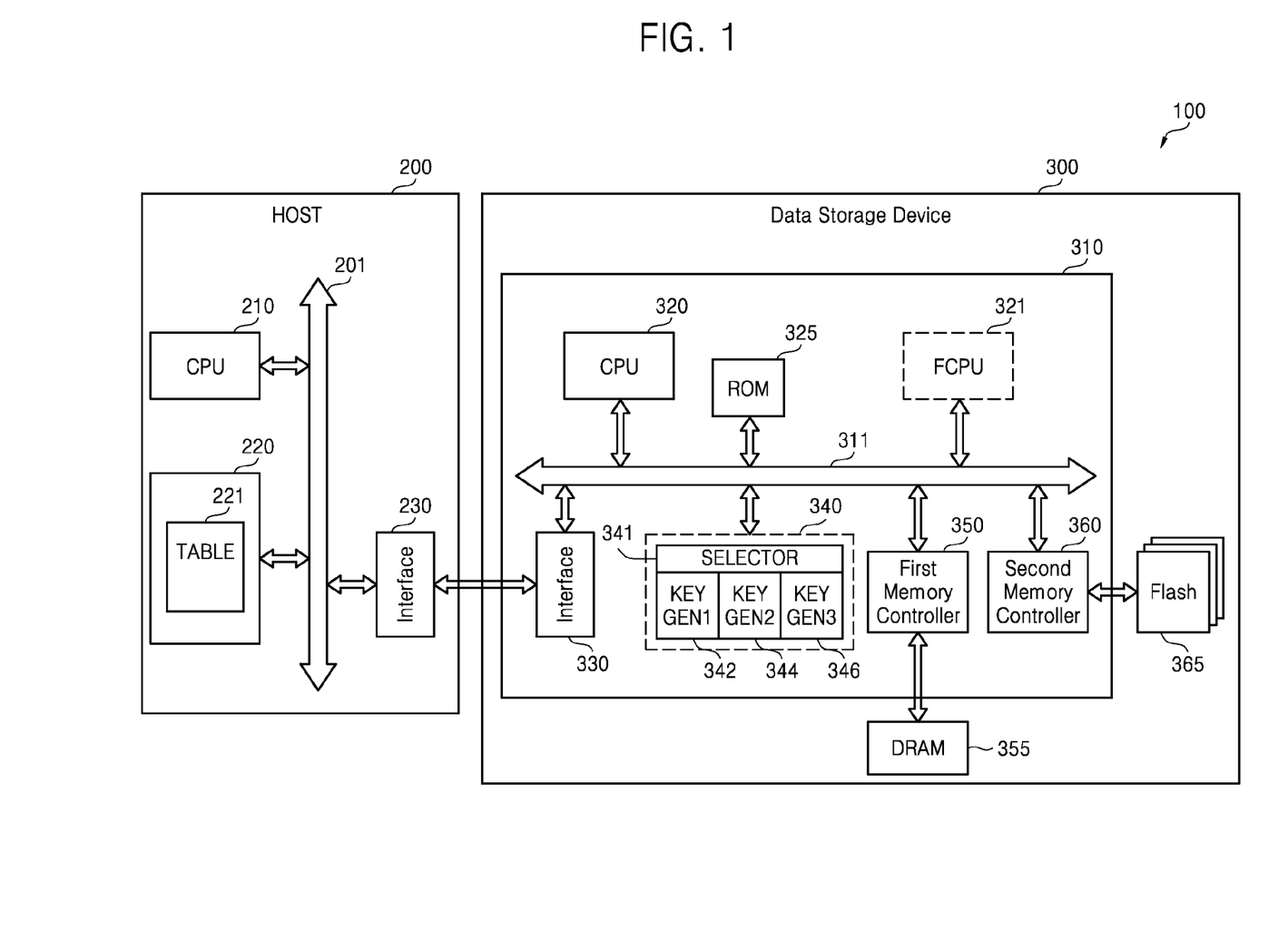
FIG. 1 is a block diagram of a data processing system according to an exemplary embodiment of the present inventive concepts.

FIG. 1 is a block diagram of a data processing system according to an exemplary embodiment of the present inventive concepts. Referring to FIG. 1, a data processing system 100 includes a host 200 and a data storage device 300.

According to an exemplary embodiment, the data processing system 100 may be embodied as a database management system (DBMS) or a relational DBMS (RDBMS). The DBMS may include a column-oriented DBMS or a row-oriented DBMS.

According to another exemplary embodiment, the data processing system 100 may be embodied as a system which may support a Structured Query Language (SQL) or a NoSQL.

According to still another exemplary embodiment, the data processing system 100 may be embodied as a personal computer (PC) or a portable electronic device which includes the data storage device 300. The portable electronic device may be embodied in a laptop computer, a mobile phone, a smart phone, a tablet PC, a mobile internet device (MID), or a wearable computer.

When the data storage device 300 is embodied in a solid state drive (SSD), an embedded SSD (eSSD), or a universal flash storage (UFS), the data processing system 100 may be embodied in a data processing system including the SSD, the eSSD, or the UFS.

In the data processing system 100, the data storage device 300 generates an authentication key for data de-duplication, and the host 200 performs mapping on de-duplicated data, and management on an authentication key of the data. The authentication key may mean a key which may perform a function of authenticating data, e.g., a fingerprint or a hash key.

For example, the host 200 and the data storage device 300 may communicate with each other through a serial advance technology attachment (SATA), a Serial Attached SCSI (SAS), or a Peripheral Component Interconnect Express (PCIe).

The host 200 includes a CPU 210, a memory 220, and an interface 230.

The CPU 210 may control the memory 220 and the interface 230 through a bus 201. The CPU 210 may generate a command which may control an operation of the data storage device 300, and transmit the command to the interface 330 of the data storage device 300 through the bus 201 and the interface 230. As described above, each of the interfaces 230 and 330 may support the SATA, the SAS, or the PCIe protocol.

The memory 220 may store a table 221 including authentication keys. For example, the memory 220 may be embodied in a volatile memory or a non-volatile memory.

The host 200 may further include a data processing circuit (not shown) which processes data transmitted to the data storage device 300. The data processing circuit may include a memory and a memory controller which controls an operation of the memory.

The data storage device 300 includes a control circuit 310, a volatile memory 355, and a non-volatile memory 365.

The control circuit 310 may control an operation of the volatile memory 355 and the non-volatile memory 365 based on a command output from the host 200. The control circuit 310 may be embodied in an integrated circuit (IC) or a system on chip (SoC).

The control circuit 310 includes a bus 311, a first CPU 320, a read only memory (ROM) 325, an interface 330, an authentication key generation circuit 340, a first memory controller 350, and a second memory controller 360. According to an exemplary embodiment, the control circuit 310 may further include a second CPU 321.

The first CPU 320 may interpret (or analyze) each command output from the host 200, and control the ROM 325, the interface 330, the authentication key generation circuit 340, the first memory controller 350, the second CPU 321, and/or the second memory controller 360 according to a result of the interpretation (or analyzing).

According to an exemplary embodiment, when the control circuit 310 includes all of the first CPU 320 and the second CPU 321, one or more elements, e.g., 330, 340, and/or 350, controlled by the first CPU 320, and one or more elements, e.g., 360, controlled by the second CPU 321 may be determined by a designer of the control circuit 310.

The ROM 325 may store a program and/or data necessary for an operation of the control circuit 310. Therefore, each CPU 320 or 321 may control necessary element(s) using the program and/or the data stored in the ROM 325.

The host 200 and the data storage device 300 may transmit or receive data and/or commands each other through each interface 230 and 330.

The authentication key generation circuit 340 may generate an authentication key using write data output from the host 200. The authentication key generation circuit 340 includes a selector 341 and a plurality of authentication key generation engines 342, 344, and 346.

For example, the selector 341 and the plurality of authentication key generation engines 342, 344, and 346 may be embodied in hardware. For example, each of the plurality of authentication key generation engines 342, 344, and 346 may be embodied in a hash key generator which may authenticate corresponding data using a hash function.

The selector 341 may selectively enable one of the plurality of authentication key generation engines 342, 344, and 346 according to a control of the CPU 320.

Each of the plurality of authentication key generation engines 342, 344, and 346 may generate an authentication key using a different authentication algorithm. For example, one of the plurality of authentication key generation engines 342, 344, and 346 may generate an authentication key using SHA-1, another of the plurality of authentication key generation engines 342, 344, and 346 may generate an authentication key using SHA-2, and still another of the plurality of authentication key generation engines 342, 344, and 346 may generate an authentication key using Message-Digest algorithm 5(MD5).

For convenience of description in FIG. 1, three authentication key generation engines 342, 344, and 346 are illustrated; however, these are not more than exemplification. Therefore, a technical concept of the present inventive concepts is not limited to the number of the authentication key generation engines embodied in the control circuit 310. According to another exemplary embodiment, the selector 341 and the plurality of authentication key generation engines 342, 344, and 346 may be stored in the ROM 325 or the non-volatile memory 365 in a form of firmware. Here, the firmware may be loaded to the CPU 320 and performed by the CPU 320.

The first memory controller 350 controls an access operation, e.g., data write operation or data read operation, for the volatile memory 355.

For example, the volatile memory 355 may be embodied as a dynamic random access memory (DRAM), a static random access memory (SRAM), a thyristor RAM (T-RAM), a zero capacitor RAM (Z-RAM), or a Twin Transistor RAM (TTRAM). According to another exemplary embodiment, the volatile memory 355 may be embodied in the control circuit 310.

The second memory controller 360 controls a data access operation for the non-volatile memory 365. For example, the non-volatile memory 365 may be embodied as an Electrically Erasable Programmable Read-Only Memory (EEPROM), a flash memory, a Magnetic RAM (MRAM), a Spin-Transfer Torque MRAM, a Ferroelectric RAM (FeRAM), a Phase change RAM (PRAM), a Resistive RAM, a Nanotube Floating Gate Memory (NFGM), a holographic memory, a Molecular Electronics Memory Device, or an Insulator Resistance Change Memory.

When the non-volatile memory 365 is embodied in a flash memory, the flash memory may be embodied in a NAND flash memory or a NOR flash memory.

Figure 2:
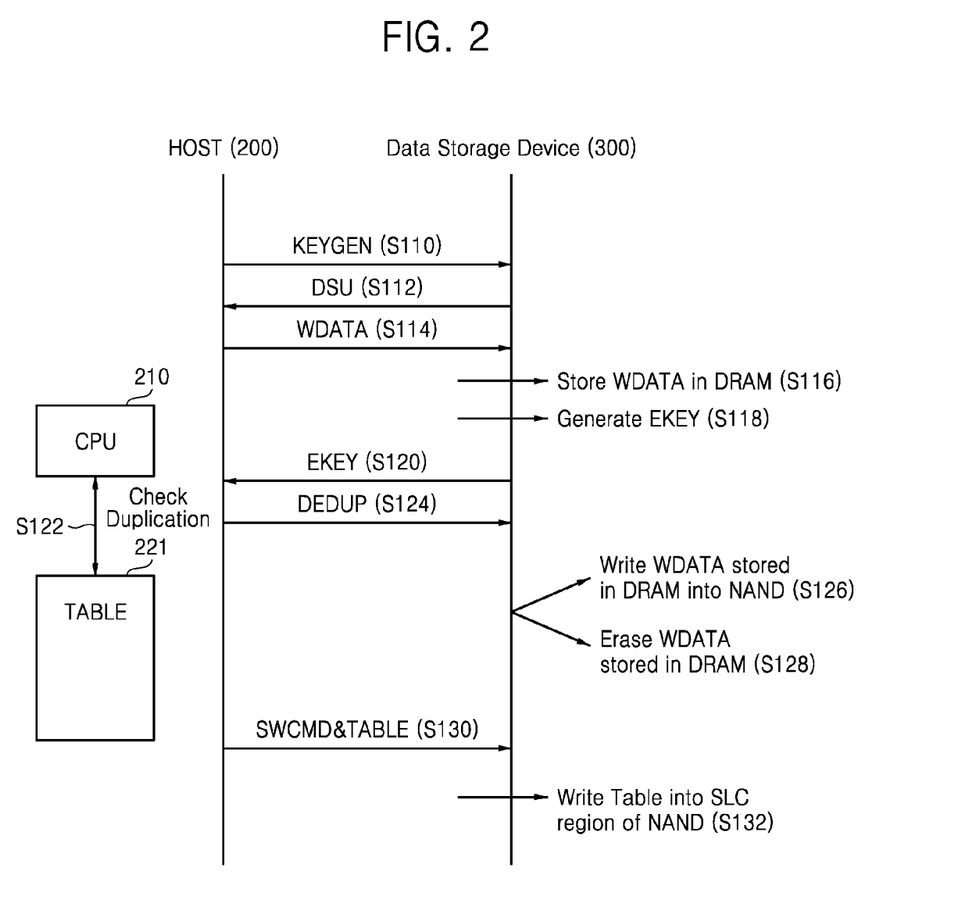
FIG. 2 is a flowchart for describing an operation of the data processing system illustrated in FIG. 1.
Figure 3:
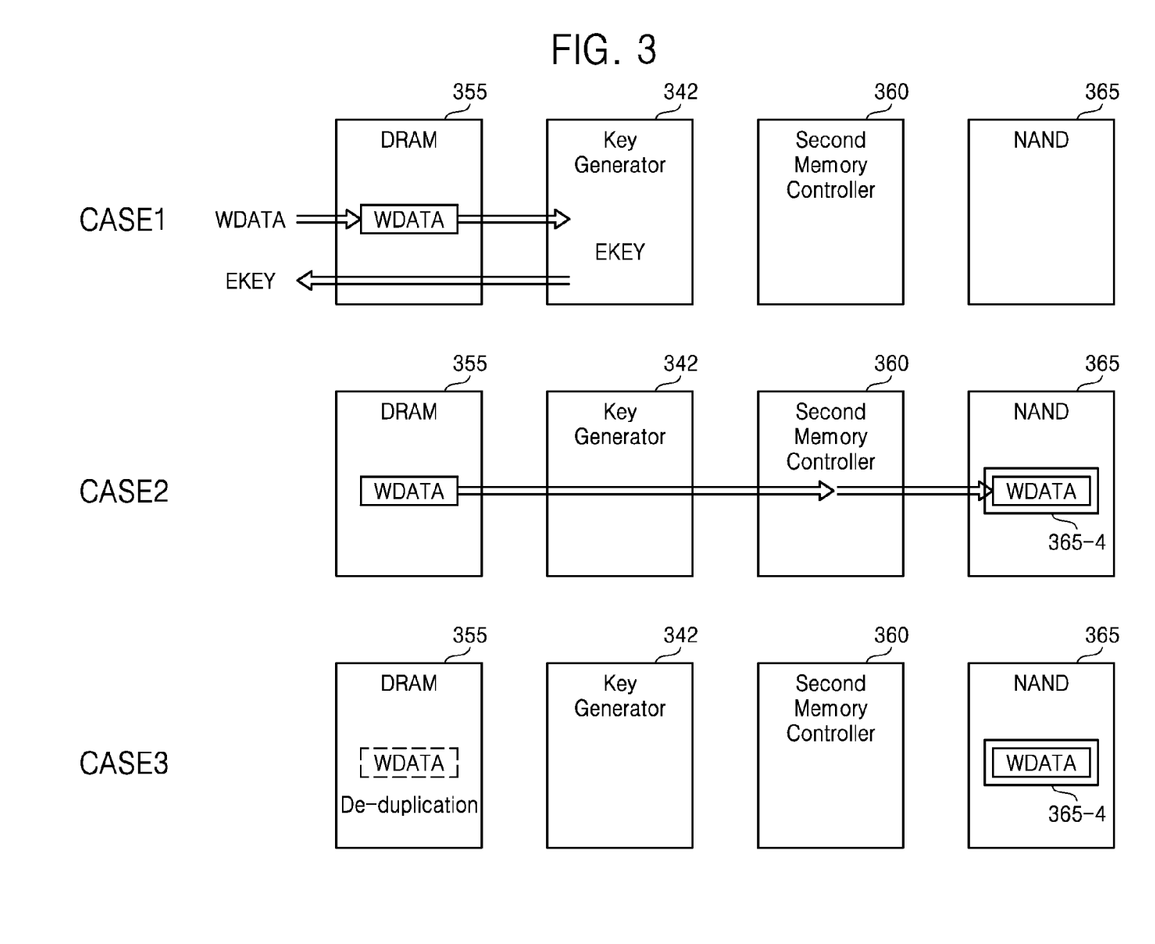
FIG. 3 is a conceptual diagram for describing an operation of the data processing system illustrated in FIG. 1.

FIG. 2 is a flowchart for describing an operation of the data processing system illustrated in FIG. 1, and FIG. 3 is a conceptual diagram for describing an operation of the data processing system illustrated in FIG. 1. Data de-duplication will be described referring to FIGS. 1 to 3.

The host 200, e.g., the CPU 210, generates a first command (e.g., an authentication key generation command KEYGEN), and transmits the first command KEYGEN to the data storage device 300 through elements 201 and 230 (step S110).

The data storage device 300, e.g., the CPU 320, sets one or more configuration elements, e.g., 325, 330, 340, 350 and/or 355, necessary for generating an authentication key EKEY in response to the first command KEYGEN received through the interface 330, and transmits a setting completion signal DSU to the host 200 through the interface 330 (step S112).

For example, when the first command KEYGEN may include selection information, the CPU 320 generates a selection signal in response to the selection information, and the selector 341 selectively enables one, e.g., 342, of the plurality of authentication key generation engines 342, 344, and 346 in response to the selection signal. Or, one of the plurality of authentication key generation engines may be enabled as a default authentication key generation engine after releasing a system reset of the data storage device 300 or the host 200.

The host 200, e.g., the CPU 210, transmits write data WDATA to the data storage device 300 through the interface 230 in response to the setting completion signal DSU (step S114).

The first memory controller 350 stores the write data WDATA in the volatile memory 355, e.g., DRAM, according to a control of the CPU 320 (step S116).

The authentication key generation engine 342 selected based on selection information included in the first command KEYGEN generates an authentication key EKEY using the write data WDATA stored in the volatile memory 355 under the control of the CPU 320 (step S118).

The data storage device 300 uses the first command KEYGEN to generate the authentication key EKEY. Here, the first command KEYGEN may be a newly-defined user command or a vendor specific command.

In a write operation of a related art, write data corresponding to a write command is written in the non-volatile memory 365 via the volatile memory 355; however, the data storage device 300 according to an exemplary embodiment of the present inventive concepts writes the write data WDATA in the volatile memory 355 in response to the newly-defined first command KEYGEN, and does not write the write data WDATA in the non-volatile memory 365, e.g., a NAND flash memory.

That is, the data storage device 300 does not write the write data WDATA stored in the volatile memory 355 in the non-volatile memory 365, e.g., the NAND flash memory, until a second command DEDUP including an indication signal having a first level is input.

As illustrated in FIG. 2 and CASE 1 of FIG. 3, an authentication key EKEY generated by the data storage device 300 based on the first command KEYGEN and the write data WDATA are transmitted to the CPU 210 of the host 200 according to a control of the CPU 320 (step S120).

The data storage device 300 may generate the authentication key EKEY based on a chunk size of the write data that corresponds to a group of pages, a block and/or a group of block of the non-volatile memory 365. If a size of the write data that is requested to be stored in the data storage device 300 is larger than a processing unit of the authentication key generation engine 342, the data storage device 300 may generate a plurality of authentication keys EKEYs by the processing unit of the authentication key generation engine 342. Accordingly, the host 200 may check whether or not the chunk size of the write data are duplicated based on the plurality of authentication keys EKEYs which correspond to a plurality of chunks divided from the write data. The host 200 may selectively de-duplicate based on the chunk size and manage the authentication key table TABLE by a unit of the chunk size of the write data.

The CPU 210 of the host 200 checks whether or not the write data are duplicated (or duplication) using the authentication key EKEY (step S122). The CPU 210 compares an authentication key stored in each entry of the authentication key table 211 with the authentication key EKEY corresponding to the write data WDATA, generates a second command (e.g., a de-duplication command DEDUP) according to a result of the comparison, and transmits the second command DEDUP to the CPU 320 of the data storage device 300 (step S124).

Figure 5:
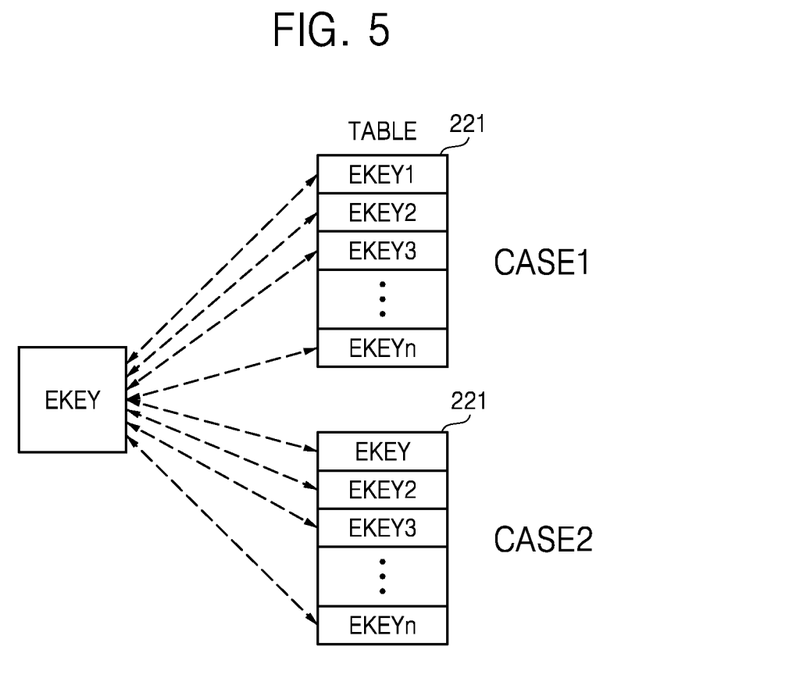
FIG. 5 is a conceptual diagram for describing an operation of a CPU of a host illustrated in FIG. 1, which checks whether or not data are duplicated.

FIG. 5 is a conceptual diagram for describing an operation of a CPU of the host illustrated in FIG. 1, which checks whether or not data are duplicated.

For example, as in CASE 1 of FIG. 5, when the write data WDATA are not duplicated, that is, when data the same as the write data WDATA are not stored in the non-volatile memory 365, e.g., the NAND flash memory, the CPU 210 transmits the second command DEDUP including an indication signal having a first level to the CPU 320 of the data storage device 300 (step S124).

For example, authentication keys EKEY1 to EKEYn stored in each entry of the authentication key table 211 do not accord with the authentication key EKEY corresponding to the write data WDATA, the CPU 210 may generate the second command DEDUP including an indication signal having a first level.

According to an exemplary embodiment, the first memory controller 350 transmits the write data WDATA stored in the volatile memory 355 to the second memory controller 360 according to a control of the CPU 320. According to another exemplary embodiment, the second memory controller 360 which may perform a function of DMA may read the write data WDATA stored in the volatile memory 355 under the control of the CPU 320.

Accordingly, the second memory controller 360 writes the write data WDATA stored in the volatile memory 355 into a second region 365-4 of the non-volatile memory 365 according to a control of a corresponding CPU 320 or 321 (step S126 of FIG. 2 and CASE 2 of FIG. 3).

However, when the write data WDATA are duplicated as in CASE 2 of FIG. 5, that is, data the same as the write data WDATA of the non-volatile memory 365 are already stored, the CPU 210 transmits the second command DEDUP including an indication signal having a second level to the CPU 320 of the data storage device 300 (step S124).

For example, when any one of the authentication keys EKEY, EKEY2, . . . , EKEYn stored in entries of the authentication key table 211 accords with the authentication key EKEY corresponding to the write data WDATA, the CPU 210 may generate the second command DEDUP including an indication signal having a second level.

The first memory controller 350 deletes the write data WDATA stored in the volatile memory 355 according to a control of the CPU 320. That is, the first memory controller 350 performs an operation of data de-duplication on the write data WDATA according to a control of the CPU 320 (step S128 of FIG. 2, CASE 3 of FIG. 3). The deleting operation the write data WDATA may be adjusting a write pointer of the volatile memory 355 or flushing the volatile memory 355 instead of overwriting or erasing memory cells in the volatile memory 355 by one or zero.

For example, the CPU 210 of the host 200 may update the authentication key table 221 after performing the step S122.

The CPU 210 of the host 200 transmits a third command, e.g., an authentication key table write command SWCMD, and the authentication key table TABLE to the data storage device 300 when there is a need to write the authentication key table 221 in the non-volatile memory 365 (step S130).

The CPU 320 or 321 of the data storage device 300 controls an operation of the second memory controller 360 in response to a third command SWCMD, and the second memory controller 360 writes the authentication key table TABLE in a first region 365-3 of the non-volatile memory 365.

The non-volatile memory 365, e.g., flash memory, may store the authentication key table TABLE in the first region 365-3 by a single level cell (SLC) writing method. For example, after the authentication key table TABLE is updated by the host 200 or before the data processing system 100 in FIG. 1 is powered off, the authentication key table TABLE may be stored in the first region 365-3.

The SLC writing method includes a case of writing data in SLC region when the first region 365-3 is embodied in the SLCs or a case of writing data on the first region 365-3 by way of writing data in SLC region even though the first region 365-3 is embodied in multi level cells (MLCs). The MLC region of the present inventive concepts collectively refers to a cell region which may store two or more bits per a cell. On the other hand, a MLC writing method includes a case of writing data in MLC region by a well know MLC writing procedure based on a structure or characteristic of the multi level cells (MLCs).

An update of the authentication key table TABLE is frequently performed and the authentication key table TABLE is frequently read, so that a SLC writing method is more effective than a MLC writing method as a storage method of the authentication key table TABLE.

Figure 4:
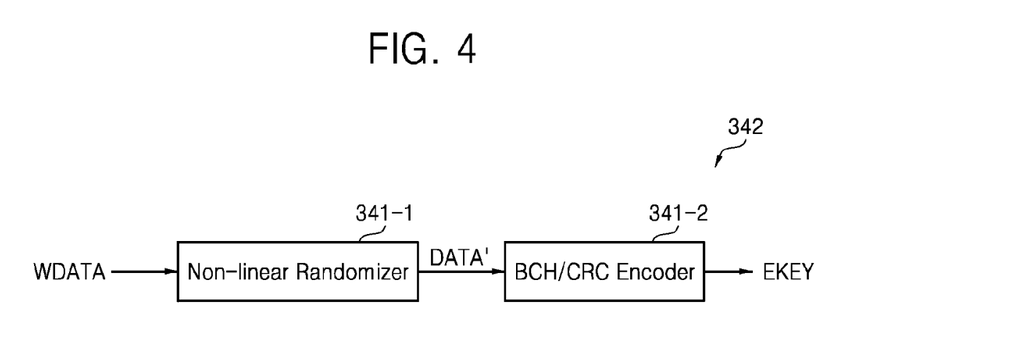
FIG. 4 is a block diagram of an example of an authentication key generation module illustrated in FIG. 1.

FIG. 4 is a block diagram of an example of the authentication key generation module illustrated in FIG. 1. An authentication key generation module 342 which may reduce an amount of operation (or computation) may include a randomizer 341-1 and an encoder 341-2. The encoder 341-2 may be embodied in a Bose-Chaudhuri-Hocquenghem (BCH) encoder or a cyclic redundancy check (CRC) encoder.

The randomizer 341-1 may perform non-linear randomizing on the write data WDATA, and output non-linear randomized data DATA'.

It is difficult to find out a data pair which causes hash collision when performing the non-linear randomizing even though a polynimial of BCH or a polynimial of CRC is acquired. The randomizer 341-1 may be any mixer to indicate the identity of the write data and may not be limited to a particular randomizer.

When the encoder 341-2 is embodied in (or as) a BCH encoder, the BCH encoder performs a BCH encoding on the non-linear randomized data DATA', and generates an authentication key EKEY corresponding to a result of the encoding.

When the encoder 341-2 is embodied in (or as) a CRC encoder, the CRC encoder performs a CRC encoding on the non-linear randomized data DATA' and generates the authentication key EKEY corresponding to a result of the encoding.

The BCH encoder 341-2 or the CRC encoder 341-2 has a small amount of operation (or computation) for generating the authentication key EKEY. The encoder 341-2 may be embodied in an encoder using Advanced Encryption Standard (AES) according to an exemplary embodiment.

Figure 6:
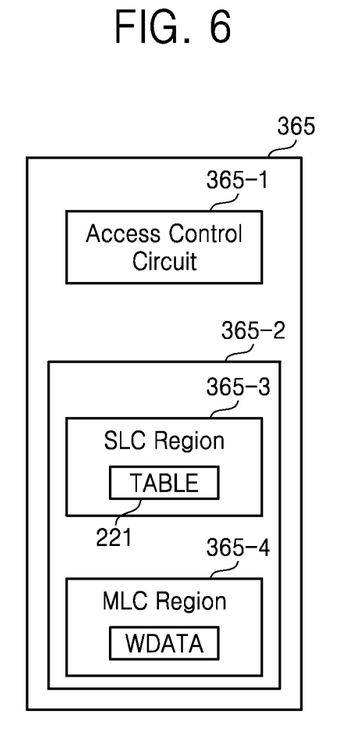
FIG. 6 is a schematic structure of an example of a flash memory illustrated in FIG. 1.

FIG. 6 is a schematic structure of an example of the flash memory illustrated in FIG. 1.

The non-volatile memory 365, e.g., the NAND flash memory, includes an access control circuit 365-1 and a NAND memory cell array 365-2.

The access control circuit 365-1 may control a write operation to write data in the NAND memory cell array 365-2 and a read operation to read data from the NAND memory cell array 365-2. The NAND memory cell array 365-2 includes a first region 365-3 in which the authentication key table TABLE may be stored and a second region 365-4 in which the write data WDATA may be stored.

The authentication key table TABLE may be stored by the SLC writing method regardless of a structure or characteristic of NAND memory cells included in the first region 365-3. The write data WDATA may be stored in the second region 365-4 in the MLC writing method, and the second region 365-4 may include MLCs.

Figure 7:
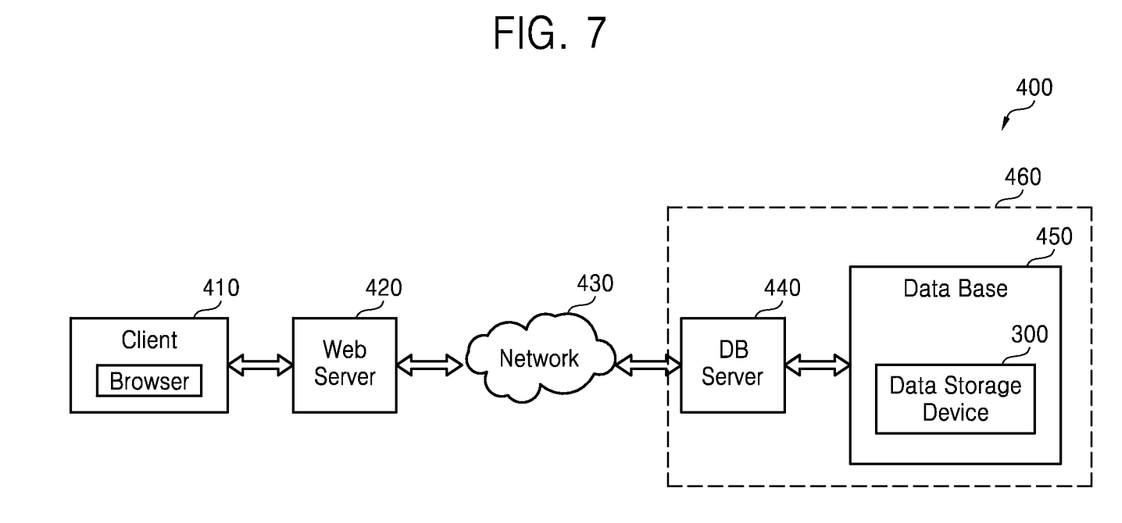
FIG. 7 is a block diagram of a data processing system according to another exemplary embodiment of the present inventive concepts.

FIG. 7 is a block diagram of a data processing system according to another exemplary embodiment of the present inventive concepts. Referring to FIGS. 1 to 7, a data processing system 400 may include a client computer 410, a web server 420, a network 430, and a data server system 460.

The data server system 460 may include a database server 440, and a database 450. For example, the data server system 460 may mean a search portal or an Internet data center (IDC).

The client computer 410 may communicate with the web server 420 over a network. The client computer 410 may be embodied in a personal computer (PC), a laptop computer, a smart phone, a tablet PC, a personal digital assistant (PDA), a mobile internet device (MID), or a wearable computer.

The web server 420 may communicate with the database server 440 over the network 430. The database server 440 may perform a function of the host 200 of FIG. 1. The database server 440 may control an operation of the database 450. The database server 440 may access the database 450. The database 450 includes a plurality of data storage devices 300.

The web server 420 and the database server 440 may communicate with each other over the network 430. The network 430 may mean a wired network, a wireless network, a internet, or a mobile phone network.

A data storage device according to an exemplary embodiment of the present inventive concepts may generate a fingerprint or an authentication key necessary for data de-duplication. A host according to an exemplary embodiment of the present inventive concepts may efficiently manage mapping of de-duplicated data and an authentication key of the de-duplicated data. That is, in a system including the data storage device and the host, the data storage device may perform a function of generating the fingerprint or the authentication key, and the host may perform a function of managing mapping of de-duplicated data and an authentication key of the de-duplicated data.

A data storage device according to an exemplary embodiment of the present inventive concepts may reduce an amount of operation (or computing) and operation time (or computing time) consumed in generating a fingerprint or an authentication key.

While the present inventive concepts have been particularly shown and described with reference to exemplary embodiments thereof, it will be understood by those of ordinary skill in the art that various changes in forms and details may be made therein without departing from the spirit and scope of the present inventive concepts as defined by the following claims.

What is claimed is:

1. A method of operating a data storage device which is configured to perform data de-duplication, the method comprising:
   receiving a first command and write data from a host;
   storing the write data in a volatile memory in response to the first command; and
   in response to receiving a second command output from the host, deleting the write data stored in the volatile memory or writing the write data stored in the volatile memory into a non-volatile memory,
   wherein the second command includes an indication signal which indicates whether or not the write data are duplicated.

2. The method of claim 1, further comprising:
   generating an authentication key using the write data based on the first command; and
   transmitting the authentication key to the host.

3. The method of claim 2, wherein the generating the authentication key is performed by a selected one of a plurality of authentication key generation engines each using a different authentication algorithm.

4. The method of claim 3, wherein each of the plurality of authentication key generation engines is embodied in hardware.

5. The method of claim 3, wherein the selected one is selected based on the first command.

6. The method of claim 3, wherein the generating the authentication key comprises:
   non-linear randomizing the write data using the selected one; and
   generating the authentication key by performing a cyclic redundancy check(CRC) encoding or Bose-Chaudhuri-Hocquenghem (BCH) encoding on the non-linear randomized data.

7. The method of claim 2, wherein the generating the authentication key comprises:
   generating the authentication key based on a write data size that corresponds to one of a group of pages, a block and a group of blocks of the non-volatile memory.

8. The method of claim 2, wherein, when the volatile memory is a DRAM, the non-volatile memory is a NAND flash memory including a SLC region and a MLC region, and the data storage device is a solid state drive (SSD), the method further comprising:
   receiving a third command output from the host and an authentication key table including the authentication key; and
   writing the authentication key table in the SLC region based on the third command.

9. A method of operating a system which includes a data storage device configured to perform a data de-duplication and a host controlling an operation of the data storage device, the method comprising:
   receiving, by the data storage device, a first command and write data output from the host;
   storing the write data in a volatile memory in response to the first command; and
   in response to receiving a second command output from the host, deleting, by the data storage device, the write data stored in the volatile memory or writing, by the data storage device, the write data stored in the volatile memory into a non-volatile memory,
   wherein the second command includes an indication signal which indicates whether or not the write data are duplicated.

10. The method of claim 9, further comprising:
    generating, by the data storage device, an authentication key using the write data based on the first command;
    transmitting, by the data storage device, the authentication key to the host; and
    comparing, by the host, the authentication key and each of authentication keys included in an authentication key table, generating the second command including an indication signal which indicates whether or not the write data are duplicated according to a result of the comparison, and transmitting the generated second command to the data storage device.

11. The method of claim 10, wherein the generating the authentication key is performed by a selected one of a plurality of authentication key generation engines each using a different authentication algorithm.

12. The method of claim 11, wherein each of the plurality of authentication key generation engines is embodied in hardware, and the selected one parses the first command and is selected based on a result of the parsing.

13. The method of claim 11, wherein each of the plurality of authentication key generation engines is embodied in firmware, and the selected one parses the first command and is selected by a CPU based on a result of the parsing.

14. The method of claim 10, wherein the generating the authentication key includes:
    non-linear randomizing the write data using an authentication key generation engine; and
    generating the authentication key from non-linear randomized data using a BCH encoder or a CRC encoder.

15. The method of claim 10, the method further comprising:
    receiving, by the data storage device, a third command output from the host and the authentication key table including the authentication key; and
    writing, by the data storage device, the authentication key table in a SLC region of the non-volatile memory based on the third command.

16. A data storage device comprising:
    a volatile memory;
    a non-volatile memory; and
    a control circuit configured to:
    receive a first command and write data output from a host;
    write the write data in the volatile memory in response to the first command; and
    in response to a second command output from the host, delete the write data stored in the volatile memory or write the write data stored in the volatile memory into the non-volatile memory,
    wherein the second command includes an indication signal which indicates whether or not the write data are duplicated.

17. The data storage device of claim 16, wherein the control circuit comprises:
    a CPU configured to generate a selection signal in response to selection information included in the first command;
    a plurality of authentication key generation engines configured to generate an authentication key based on the write data stored in the volatile memory;

a selector configured to selectively enable one of the plurality of authentication key generation engines in response to the selection signal;

a first memory controller configured to store the write data in the volatile memory according to a control of the CPU; and a second memory controller configured to transmit the write data output from the volatile memory to the non-volatile memory according to a control of the CPU, wherein the authentication key is transmitted to the host by the control circuit.

18. The data storage device of claim 17, wherein, when the CPU receives the second command including the indication signal which indicates the write data are duplicated from the host, the CPU controls the first memory controller to delete the write data stored in the volatile memory.

19. The data storage device of claim 17, wherein, when the CPU receives the second command including the indication signal which indicates that the write data are not duplicated from the host, the CPU controls at least one of the first memory controller and the second memory controller to write the write data stored in the volatile memory into the non-volatile memory.

20. The data storage device of claim 17, wherein the authentication key is generated based on a write data size that corresponds to one of a group of pages, a block and a group of blocks of the non-volatile memory.

* * * * *